United States Patent
Kim et al.

(10) Patent No.: US 9,669,309 B2
(45) Date of Patent: Jun. 6, 2017

(54) METHOD FOR MANAGING LEAGUE POINT OF POINT LAPSING LEAGUE MODE AND SERVER FOR PROVIDING POINT LAPSING LEAGUE MODE

(71) Applicant: INTELLECTUAL DISCOVERY CO., LTD., Seoul (KR)

(72) Inventors: Jeong Hun Kim, Seoul (KR); Min Seong Kim, Yongin-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 62 days.

(21) Appl. No.: 14/369,876

(22) PCT Filed: Nov. 27, 2012

(86) PCT No.: PCT/KR2012/010098
§ 371 (c)(1),
(2) Date: Jun. 30, 2014

(87) PCT Pub. No.: WO2013/100392
PCT Pub. Date: Jul. 4, 2013

(65) Prior Publication Data
US 2014/0370991 A1    Dec. 18, 2014

(30) Foreign Application Priority Data

Dec. 28, 2011    (KR) .................. 10-2011-0145284

(51) Int. Cl.
*A63F 13/30* (2014.01)
*A63F 13/46* (2014.01)
*A63F 13/828* (2014.01)

(52) U.S. Cl.
CPC ............ *A63F 13/46* (2014.09); *A63F 13/828* (2014.09)

(58) Field of Classification Search
CPC .............................. A63F 13/46; A63F 13/828
See application file for complete search history.

(56) References Cited

U.S. PATENT DOCUMENTS 8,388,443 B1 * 3/2013 Korey et al. .................... 463/31
2002/0160835 A1 * 10/2002 Fujioka .................. A63F 13/10
463/31

(Continued)

FOREIGN PATENT DOCUMENTS

JP    2009-100843 A    5/2009
KR    10-2000-0030156 A    6/2000

(Continued)

OTHER PUBLICATIONS

International Search Report issued in PCT Appln. No. PCT/KR2012/010098 on Jan. 28, 2013, 4 pages.

*Primary Examiner* — James S McClellan
*Assistant Examiner* — Kevin Carter

(57) ABSTRACT

A method for managing league points of a point lapsing league mode includes: by a point lapsing league mode providing server, providing a point lapsing league mode that is a mode in which predetermined league points are allocated for a predetermined period and progress of a game is restricted when all the league points are consumed to the user terminal; outputting a game character information selecting interface that is an interface for accessing the user terminal to select a game character for progressing a game of the point lapsing league mode from among at least one game character to the user terminal; consuming predetermined league points of the user when the user terminal finishes playing the game of the point lapsing league mode through the game character selected by the user; determining whether all league points of the user having participated in the point lapsing league mode are consumed; and outputting information for notifying that the game cannot be progressed (Continued)

in the point lapsing league mode to the user terminal when all the league points of the user having participated in the point lapsing league mode are consumed.

13 Claims, 6 Drawing Sheets

(56) References Cited

U.S. PATENT DOCUMENTS

| | | | |
|---|---|---|---|
| 2002/0193157 A1* | 12/2002 | Yamada et al. ................... | 463/9 |
| 2005/0049731 A1* | 3/2005 | Dell .............................. | 700/91 |
| 2005/0221879 A1* | 10/2005 | Tsuchiya ................. | A63F 13/10 |
| | | | 463/8 |
| 2006/0038349 A1* | 2/2006 | Meeks ...................... | A63F 1/04 |
| | | | 273/308 |
| 2006/0154713 A1* | 7/2006 | Sunazuka ............... | A63F 13/12 |
| | | | 463/6 |
| 2007/0225067 A1* | 9/2007 | Olson ............................ | 463/25 |
| 2008/0287175 A1* | 11/2008 | Kusuda ................... | A63F 13/12 |
| | | | 463/17 |
| 2010/0210362 A1* | 8/2010 | Toompere ...................... | 463/42 |
| 2012/0046093 A1* | 2/2012 | Yamaguchi ............. | A63F 13/69 |
| | | | 463/23 |

FOREIGN PATENT DOCUMENTS

| | | |
|---|---|---|
| KR | 10-2002-0019646 A | 3/2002 |
| KR | 10-2005-0109350 A | 11/2005 |

* cited by examiner

METHOD FOR MANAGING LEAGUE POINT OF POINT LAPSING LEAGUE MODE AND SERVER FOR PROVIDING POINT LAPSING LEAGUE MODE

CROSS REFERENCE TO RELATED APPLICATIONS

This application is a 35 U.S.C. §371 National Phase Entry Application from PCT/KR2012/010098, filed Nov. 27, 2012, and designating the United States, which claims priority under 35 U.S.C. §119 to Korean Patent Application No. 10-2011-0145284 filed Dec. 28, 2011, which are incorporated herein in their entireties.

TECHNICAL FIELD

The present invention relates to a technique for providing a point lapsing league mode that is a mode for allocating predetermined league points for a predetermined period, and restricting progress of a game when all the league points are consumed.

BACKGROUND ART

With the development of communications networks, various online game services have been provided. Further, as graphics techniques and the performance of user terminals are improved, high-quality game programs are being created. Game contents which provide detailed descriptions for real or visual space have also been being developed.

Accordingly, the user utilization of online games is increased, and the game genres are diversified. Recently, various online games such as sports games, role playing games, and first person shooting games have been most popular.

As one feature of the online games, users can enjoy their favorite online games with each other by simultaneously accessing the same game contents system. The users can individually enjoy the games through cooperation or competition with different users by controlling its character or the like on the same game screen.

Moreover, in the online games, the users can accomplish one mission by cooperation with different users, or can enjoy game contents by competition with different users. In this case, in the online games, it is necessary to provide contents that rouse competitive spirit between the users. This is because it is required to have the users continuously access and play the online games by rousing the competitive spirit between the users in order to maintain or increase the user utilization of the online games in terms of their features.

The online games include a game for achieving the purpose with a single match that is progressed within a short period, and a game for continuously performing given missions without any division of matches in the game.

They also include a game for consecutively providing a plurality of matches and gathering a plurality of match results to accomplish the goal.

Amongst them, the game for determining a plurality of match results and accomplishing the goal is called a tournament type of game or a league type of game.

The tournament type of game uses a game progressing method for providing a sequentially continuous match when a user wins each match, and a character or a team who finally wins from among the participating characters or teams will win the championship.

Regarding the league type of game, after a plurality of predetermined matches are executed, the character or the team who has the highest winning rate from among the participating characters or teams wins the championship. Generally, all participating characters or teams play at least one match with each other in the league game.

Since he must win over a plurality of matches in the tournament or league type game, such winnings have very different values compared to the winnings in the single match, and he can win such winnings when he has sufficient game skills. Therefore, he who has won the tournament or league type of game can be considered as a client who has relatively high loyalty to the game.

The client having relatively high loyalty will not easily stop the game when he wins the championship once in the tournament or league. The user generally executes the same tournament or league again or performs in another tournament or league.

However, the existing games provides reward items for the championship in the tournament or the league so he who has won the tournament or the league at least once challenges it again and overly challenges the championship in the tournament or the league many times within a short period of time.

DISCLOSURE

Technical Problem

The present invention has been made in an effort to provide a method for providing a point lapsing league mode in which predetermined league points are allocated for a predetermined period, progress of a game is restricted when all the league points are consumed, and a user is prevented from overly using a corresponding league by consuming his league points when game play is over.

Technical Solution

An exemplary embodiment of the present invention provides a method for managing league points of a point lapsing league mode, including: by a point lapsing league mode providing server, providing a point lapsing league mode that is a mode in which predetermined league points are allocated for a predetermined period and progress of a game is restricted when all the league points are consumed to the user terminal; outputting a game character information selecting interface that is an interface for accessing the user terminal to select a game character for progressing a game of the point lapsing league mode from among at least one game character to the user terminal; consuming predetermined league points of the user when the user terminal finishes playing the game of the point lapsing league mode through the game character selected by the user; determining whether all league points of the user having participated in the point lapsing league mode are consumed; and outputting information for notifying that the game cannot be progressed in the point lapsing league mode to the user terminal when all the league points of the user having participated in the point lapsing league mode are consumed.

Another embodiment of the present invention provides a method for managing league points of a point lapsing league mode, including: by a point lapsing league mode providing server, providing a point lapsing league mode that is a mode in which predetermined league points are allocated for a predetermined period and progress of a game is restricted when all the league points are consumed by the user terminal; outputting a game character information selecting interface that is an interface for accessing the user terminal to select a game character for progressing a game of the point lapsing league mode from among at least one game character to the user terminal; determining whether the game of the point lapsing league mode is a game with an opponent player managed by artificial intelligence when the user terminal finishes playing the game of the point lapsing league mode through the game character selected by the user; consuming the predetermined league points of the user when the game of the point lapsing league mode is a game with an opponent player managed by artificial intelligence in the determination step; determining whether all league points of the user having participated in the point lapsing league mode are consumed; and outputting information for notifying that the game cannot be progressed in the point lapsing league mode to the user terminal when all the league points of the user having participated in the point lapsing league mode are consumed.

The determination step may further include, when the game is a competition between users, consuming the league points that are set to correspond to a level of the game character used by the user in the game.

When the game of the point lapsing league mode is a game with an opponent player managed by artificial intelligence, the step of consuming predetermined league points of the user includes excluding the league points of other users except the user who has opened the game from consuming objects.

When the user terminal inputs a selection on a game character to be used for the game, the method further includes outputting at least one of game character information usable for the game, capability point information of the game character, and league points information to be consumed corresponding to the game character when the game is over to the user terminal.

Regarding the league points, predetermined league points are acquired when a game of another mode except the point lapsing league mode is progressed.

The league points include league fixed points that are provided to the user for a predetermined period as predetermined league points, and league floating points that are directly provided to the user in an item form and are additionally usable irrespective of the league points.

The outputting of information for notifying that the game cannot be progressed in the point lapsing league mode to the user terminal includes outputting a link menu so that another mode except the point lapsing league mode may be performed.

The consuming of predetermined league points of the user includes consuming the league points when access with the user terminal is blocked while performing the game, the user is determined to lose the match, and a next match is progressed.

When the game is a competition between users, the step of consuming the league points that are set to correspond to a level of the game character used by the user for the game includes, when the game is a competition between users, blocking access between the users having competed in the game, and when the access by the users is maintained, returning used league points to the user winning the game.

When the game is a competition between users, the step of consuming the league points that are set to correspond to a level of the game character used by the user for the game includes when the game is a competition between users, blocking access between the users having competed in the game, and when the access by the users is maintained, returning used league points to the user who cannot progress the game because the opponent user leaves the game before it begins.

Another embodiment of the present invention provides a server for providing a point lapsing league mode, including: a point lapsing league mode provider for providing a point lapsing league mode in which predetermined league points are allocated for a predetermined period when the user terminal is accessed, and progress of a game is limited when the league points are consumed, to the user terminal; a game character information provider for outputting a game character information selecting interface that is an interface for the accessing user terminal to select a game character for progressing a game of the point lapsing league mode from among at least one game character to the user terminal; a league point manager for consuming the user's predetermined league points when the user terminal finishes playing of a game of the point lapsing league mode through the game character selected by the user; a league progressing state determiner for determining whether all the league points of the user having participated in the point lapsing league mode are consumed; and a league participating information provider for, when all the league points of the user having participated in the point lapsing league mode are consumed, outputting information for notifying that the game cannot be progressed in the point lapsing league mode to the user terminal.

The game character information provider outputs at least one of game character information usable for the game, capability point information of the game character, and league points information to be consumed corresponding to the game character when the game is over to the user terminal when user terminal inputs a selection on the game character to be used for the game.

The league point manager excludes the league points of other users except the user who has opened the game from consuming objects when the game is a competition between a team including a plurality of users and an opponent player managed by the artificial intelligence.

The league point manager consumes the league points that are set to correspond to a level of the game character used by the user in the game when the game is a competition between users.

The game character includes capability points of the game character, and league points information to be consumed when the game is over.

Regarding the league points, predetermined league points are acquired when a game of another mode except the point lapsing league mode is progressed.

The league points includes league fixed points that are provided to the user for a predetermined period as predetermined league points, and league floating points that are directly provided to the user in an item form and are additionally usable irrespective of the league points.

The league participating information provider outputs a link menu so that another mode except the point lapsing league mode may be performed.

The league point manager consumes the league points when access with the user terminal is blocked while performing the game, the user is determined to lose the match, and a next match is progressed.

The league point manager blocks the access between the users having competed in the game when the game is a competition between users, and returns the used league points to the user winning the game when the access by the users is maintained.

The league point manager blocks the access between the users having competed in the game when the game is a competition between users, and returns the used league points to the user who cannot progress the game because the opponent user leaves the game before it begins when the access by the users is maintained.

Advantageous Effects

According to the present invention, the method for managing the league between the users who are registered to the user league group generated by the user in the online competition game to prevent the problem in which the user overly challenges championships on the tournament or the league for a multiple number of times.

MODE FOR INVENTION

Figure 1:
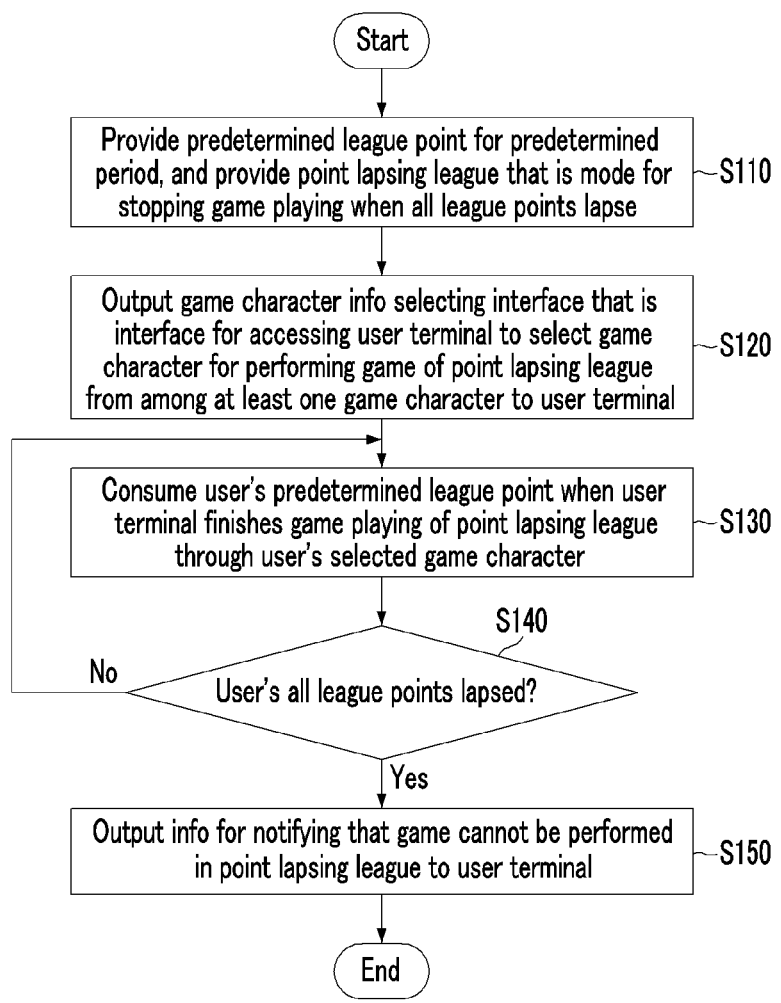
FIG. 1 shows a flowchart of a method for managing league points of a point lapsing league mode according to an exemplary embodiment of the present invention.

Hereinafter, referring to the drawings, a method for managing league points of a point lapsing league mode and a server for providing a point lapsing league mode according to exemplary embodiments of the present invention will be described.

It is obvious that the following exemplary embodiment is a detailed description which is provided for better understanding of the present invention but does not limit the scope of the present invention. Therefore, an equivalent invention which performs the same function as the present invention may also be covered by the scope of the present invention.

In adding reference numerals to components of each drawing, even though the same components are illustrated in different drawings, it is to be noted that these components are denoted by the same reference numerals if possible. In describing exemplary embodiments of the present invention, well-known functions or constructions will not be described in detail since they may unnecessarily obscure the understanding of the present invention.

In addition, in describing components of the present specification, terms such as first, second, A, B, (a), and (b) may be used. These terms are used only to differentiate the components from other components, but the nature, sequence, order, etc. of the corresponding components are not limited by these terms. When a component is "connected", "coupled", or "linked" to another component, it is to be noted that the component may be directly connected or linked to the another component, but the component may be "connected", "coupled", or "linked" to the another component via another component therebetween.

In an exemplary embodiment of the present invention, "communication", "communication network", and "network" may be used to have the same meaning. The three terminologies indicate a wired or wireless local area and wide area data transmitting/receiving network through which a file is transmitted/received between a user terminal, another user terminal, and a download server.

In the following description, "game server" indicates a server computer that users access to use game contents. In the case of a game which has a small capacity or a small number of users, a plurality of game programs may be operated by one game server. Further, in the case of a game which has a large capacity or a large number of real time accessing members, one or more game servers which operate one game may be provided depending on a function of the game.

In addition, middleware for databases or servers which perform payment processing may be connected to the game server, but the description thereof will be omitted in the present invention.

Herein, an online game indicates game contents that can be used by users who access the aforementioned game server. Particularly, the online game indicates a game that can be simultaneously accessed and enjoyed by a plurality of users and increase levels of the users by, e.g., acquiring experience levels while rearing characters through playing of the game on the game.

For ease of description, an online soccer game will be selected as an example of an online game, and the user manages the game as a soccer director to grow the team he selected through matches between the team directed by him and opponent teams. The user selects one of a plurality of countries where soccer leagues are managed and determines a league to participate in, receives a team list of the participated league to select a team to be directed by him, and begins a game by requesting a match with the opponent team selected in a random manner or according to the user's request. Further, an actual appearance of a real soccer player and his capability points are controlled to be applied to each player belonging to the team to the maximum so that the user's interest may be maximized.

In addition, the online soccer game bases league playing matches on the growth of the director and the players caused by game results, and may increase team management capability points such as participation in cup matches and rising in league levels in consideration of league records.

In the present invention, sports represent general categories of sports, and signify any sorts of sports executable as online games. For example, they include soccer, baseball, basketball, tennis, volleyball, track and field, and martial arts.

Figure 2:
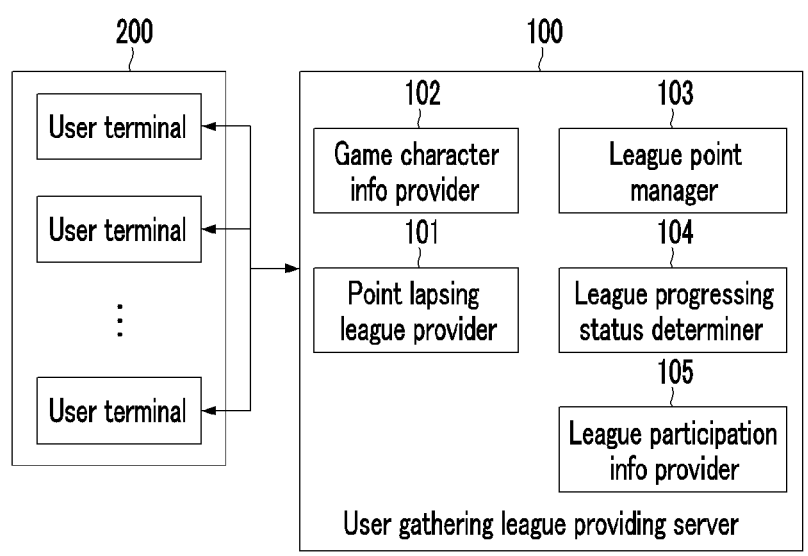
FIG. 2 shows a functional block diagram of a server for providing a point lapsing league mode according to an exemplary embodiment of the present invention.

FIG. 1 shows a flowchart of a method for managing league points of a point lapsing league mode according to an exemplary embodiment of the present invention, and FIG. 2 shows a functional block diagram of a server for providing a point lapsing league mode according to an exemplary embodiment of the present invention.

As shown in FIG. 1, the method for managing league points of a point lapsing league mode according to an exemplary embodiment of the present invention is performed by a server 100 for providing a point lapsing league mode as shown in FIG. 2 when there is no other performing subject.

The server 100 for providing a point lapsing league mode is connected to at least one user terminal 200.

First, predetermined league points are allocated for a predetermined period, and a point lapsing league mode representing a mode for restricting progress of a game when all the league points are consumed is provided to the user terminal (S110). Here, regarding the point lapsing league mode, the game for gathering a plurality of match results to achieve a goal can be called a tournament type of game or a league type of game. In this instance, the tournament type of game is a game progressing method for providing a sequentially continuous match when a user wins each match, and a character or a team who finally wins from among the participating characters or teams will win the championship. Regarding the league type of game, after a plurality of predetermined matches are executed, the character or the team that has the highest winning rate from among the participating characters or teams wins the championship. Generally, all participating characters or teams play at least one match with each other in the league game.

The point lapsing league mode according to an exemplary embodiment of the present invention progresses the game mode according to the World Cup finals method, and the user plays a game with an opponent player managed by artificial intelligence. Here, according to the World Cup finals method, thirty-two countries are divided into eight groups and are managed, and the first place team and the second place team of each group advance to the finals. Therefore, the user can select one of the countries having advanced to the World Cup finals as his game character.

The game character represents a team with eleven player characters.

Regarding the league points, it is desirable to acquire predetermined league points when a game in a mode that is different from the point lapsing league mode is progressed, and it is desirable to include league fixed points that are given to the user for a predetermined period as predetermined league points, and league floating points that are directly provided to the user in an item form and additionally usable by the user irrespective of the league points.

It is desirable to set the predetermined period of the point lapsing league mode to be one day, and the predetermined league points are desirably 20 scores, which is, however, not restricted.

Figure 4:
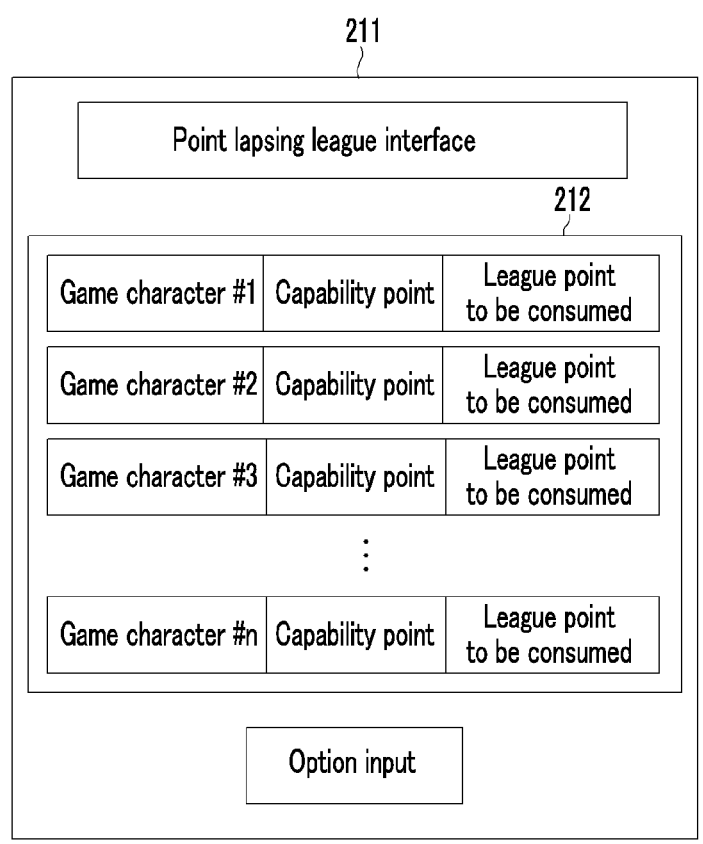
FIG. 4 shows a screen on which a point lapsing league interface is output to a user terminal in a method for managing league points of a point lapsing league mode shown in FIG. 1 and FIG. 3.

An accessing user terminal outputs a game character information selecting interface that is an interface for selecting a game character for progressing a game of the point lapsing league mode from among at least one game character to a user terminal (S120). Here, when the user terminal inputs a selection on a game character to be used for the game, it is desirable to output at least of one game character information usable for the game, capability point information of the game character, and league points information to be consumed corresponding to the game character when the game is over to the user terminal. Then, as shown in FIG. 4, a point lapsing league interface including game character information 212 including at least one game character, capability point information that is set to correspond to each game character, and league points information to be consumed that is set to correspond to each game character is output to the user terminal.

For example, the game character to be described means a team, and capability point information of the game character means a statistic of a team.

Figure 5:
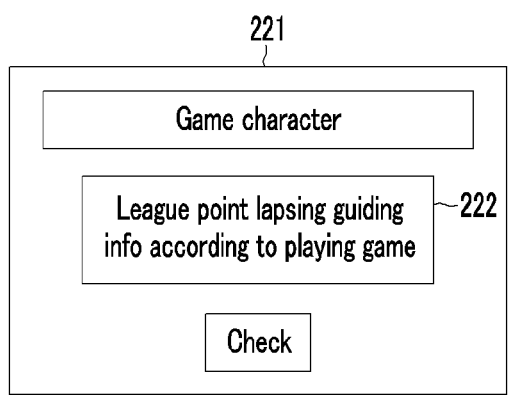
FIG. 5 shows a screen output to a user terminal when a game character is selected in a method for managing league points of a point lapsing league mode shown in FIG. 1 and FIG. 3.

When the user selects a random game character, the user terminal can output a game character information window 221 including league points information 222 to be consumed that is set to correspond to the game character selected by the user as shown in FIG. 5.

When the user terminal finishes playing of a game of the point lapsing league mode through the game character selected by the user, it consumes the user's predetermined league points (S130).

After this, it is determined whether all the league points of the user having participated in the point lapsing league mode are consumed (S140).

When all the league points of the user having participated in the point lapsing league mode are consumed (YES) in the determination step S140, information for notifying that the game cannot be progressed in the point lapsing league mode is output to the user terminal (S150).

Also, it is desirable for the step S150 to output a link menu so that modes other than the point lapsing league mode may be performed.

Figure 6:
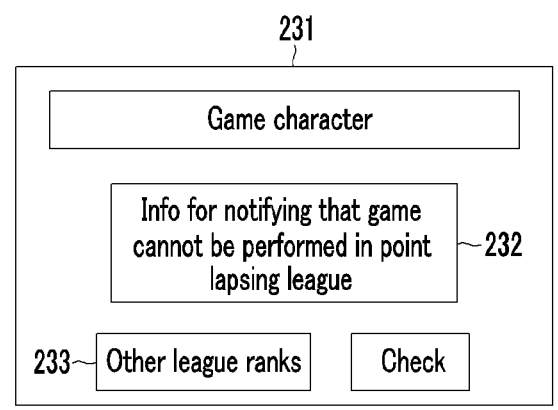
FIG. 6 shows a case of outputting information indicating that a point lapsing league having consumed league points cannot be progressed to a user terminal in a method for managing league points of a point lapsing league mode shown in FIG. 1 and FIG. 3.

As shown in FIG. 6, a game character information window 231 including information 232 for notifying that the game cannot be progressed in the point lapsing league and another league links menu 233 for linking to another league can be output to the user terminal.

Further, it is desirable in the step S150 to consume the league points when access with the user terminal is blocked while performing the game, the user is determined to lose the match, and a next match is progressed.

A method for managing league points of a point lapsing league mode according to another exemplary embodiment of the present invention will now be described with reference to FIG. 3.

Figure 3:
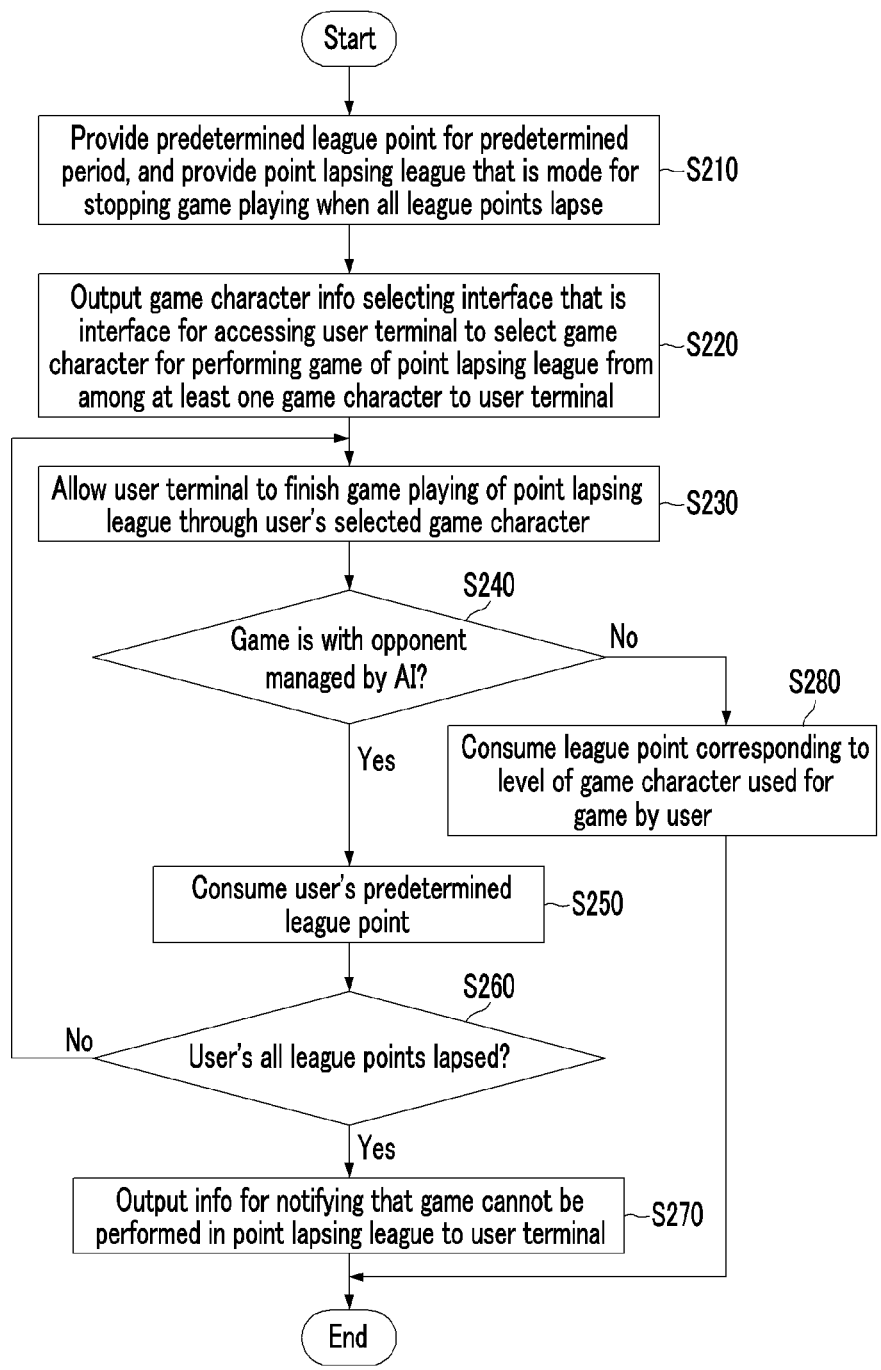
FIG. 3 shows a flowchart of a method for managing league points of a point lapsing league mode according to another exemplary embodiment of the present invention.

As shown in FIG. 3, the method for managing league points of a point lapsing league mode according to an exemplary embodiment of the present invention is performed by a server 100 for providing a point lapsing league mode when there is no other performing subject.

First, predetermined league points are allocated for a predetermined period, and a point lapsing league mode representing a mode for restricting progress of a game when all the league points are consumed is provided to the user terminal (S210). Here, regarding the league points, it is desirable to acquire predetermined league points when a game in a mode that is different from the point lapsing league mode is progressed, and it is desirable to include league fixed points that are given to the user for a predetermined period as predetermined league points, and league floating points that are directly provided to the user in an item form and additionally usable by the user irrespective of the league points.

An accessing user terminal outputs a game character information selecting interface that is an interface for selecting a game character for progressing a game of the point lapsing league mode from among at least one game character to the user terminal (S220). Then, as shown in FIG. 4, a point lapsing league interface including game character information 212 including at least one game character, capability point information that is set to correspond to each game character, and league points information to be consumed that is set to correspond to each game character is output to the user terminal.

Here, when the user terminal inputs a selection on a game character to be used for the game, it is desirable to output at least one of game character information usable for the game, capability point information of the game character, and league points information to be consumed corresponding to the game character when the game is over to the user terminal.

When the user selects a random game character, the user terminal can output a game character information window 221 including league points information 222 to be consumed that is set to correspond to the game character selected by the user as shown in FIG. 5.

When the user terminal finishes playing of a game of the point lapsing league mode through the game character selected by the user (S230), it is determined whether the game of the point lapsing league mode is a game with an opponent player managed by artificial intelligence (S240).

In the determination step S240, when the game of the point lapsing league mode is a game with an opponent player managed by artificial intelligence (YES), the user's predetermined league points are consumed (S250). In this instance, in the step S250, it is desirable to exclude the league points of other users except the user who has opened the game from consuming objects when the game is a competition between a team including a plurality of users and an opponent player managed by the artificial intelligence.

Further, it is desirable in the step S250 to consume the league points when access with the user terminal is blocked while performing the game, the user is determined to lose the match, and a next match is progressed.

It is determined whether all the league points of the user having participated in the point lapsing league mode are consumed (S260).

When all the league points of the user having participated in the point lapsing league mode are consumed (YES) in the determination step S260, information for notifying that the game cannot be progressed in the point lapsing league mode is output to the user terminal (S270). Also, it is desirable for the step S270 to output a link menu so that modes other than the point lapsing league mode may be performed. As shown in FIG. 6, a game character information window 231 including information 232 for notifying that the game cannot be progressed in the point lapsing league and another league links menu 233 for linking to another league can be output to the user terminal.

In the determination step S240, when the game is a competition between users (NO), the league points that are set to correspond to a level of the game character used by the user in the game are consumed (S280). Therefore, in the step S280, when the capability point (statistic) of the team, that is, the game character selected by the user is greater than 16,000, the league points are consumed by 5, when it is greater than 15,500, they are consumed by 4.5, when it is greater than 15,000, they are consumed by 4, when it is greater than 14,000, they are consumed by 3.5, when it is greater than 13,000, they are consumed by 3, when it is greater than 12,000, they are consumed by 2.5, when it is greater than 11,000, they are consumed by 2, when it is greater than 10,000, they are consumed by 1.5, when it is greater than 9000, they are consumed by 1, and when it is less than 9000, they are consumed by 0.5, to which the present embodiment is not restricted.

In this instance, regarding the step S280, it is desirable to block the access between the users competing in the game when the game is a competition between users, and it is desirable to return the used league points to the user winning the game when the access by the two users is maintained.

Further, regarding the step S280, it is desirable to block the access between the users having competed in the game when the game is a competition between users, and it is desirable to return the used league points to the user who cannot progress the game in the case in which the opponent user leaves before the game begins when the access by the two users is maintained.

Descriptions that are repeated in FIG. 1 and FIG. 2 will be omitted.

As shown in FIG. 2, the server 100 for providing a point lapsing league mode according to an exemplary embodiment of the present invention is connected to a user terminal 200 and at least one registered user terminal 201.

In the above-described configuration, the server 100 for providing a point lapsing league mode includes a point lapsing league mode provider 101, a game character information provider 102, a league point manager 103, a league progressing state determiner 104, and a league participating information provider 105.

The point lapsing league mode provider provides a point lapsing league mode in which predetermined league points are allocated for a predetermined period when the user terminal is accessed, and progress of a game is limited when the league points are consumed by the user terminal. Here, regarding the league points, it is desirable to acquire predetermined league points when a game of another mode except the point lapsing league mode is progressed.

Also, it is desirable for the league points to include league fixed points that are given to the user for a predetermined period as predetermined league points, and league floating points that are directly provided to the user in an item form and additionally usable by the user irrespective of the league points.

The game character information provider outputs a game character information selecting interface that is an interface for the accessing user terminal to select a game character for progressing a game of the point lapsing league mode from among at least one game character to the user terminal. Then, as shown in FIG. 4, a point lapsing league interface including game character information 212 including at least one game character, capability point information that is set to correspond to each game character, and league points information to be consumed that is set to correspond to each game character is output to the user terminal.

In this instance, when the user terminal inputs a selection on the game character to be used for the game, it is desirable for the game character information provider to output at least one of game character information usable for the game, capability point information of the game character, and league points information to be consumed corresponding to the game character when the game is over to the user terminal.

When the user selects a random game character, the user terminal can output a game character information window 221 including league points information 222 to be consumed that is set to correspond to the game character selected by the user as shown in FIG. 5.

It is desirable to include capability points of the game character and league point information to be consumed when the game is over into the game character.

The league point manager consumes the user's predetermined league points when the user terminal finishes playing of a game of the point lapsing league mode through the game character selected by the user. In this instance, it is desirable for the league point manager to exclude the league points of other users except the user who has opened the game from consuming objects when the game is a competition between a team including a plurality of users and an opponent player managed by the artificial intelligence, and it is desirable for the league point manager to consume the league points that are set to correspond to a level of the game character used by the user in the game when the game is a competition between users.

In addition, it is desirable for the league point manager to consume the league points when access with the user terminal is blocked while performing the game, the user is determined to lose the match, and a next match is progressed.

It is desirable for the league point manager to block the access between the users having competed in the game when the game is a competition between users, to return the used league points to the user winning the game, and to return the used league points to the user who cannot progress the game in the case in which the opponent user leaves the game before it begins when the access by the two users is maintained.

The league progressing state determiner determines whether all the league points of the user having participated in the point lapsing league mode are consumed.

Further, when all the league points of the user having participated in the point lapsing league mode are consumed, the league participating information provider outputs information for notifying that the game cannot be progressed in the point lapsing league mode to the user terminal. In this instance, it is desirable for the league participating information provider to output a link menu so that another mode except the point lapsing league mode may be performed. Then, as shown in FIG. 6, a game character information window 231 including information 232 for notifying that the game cannot be progressed in the point lapsing league and another league link menu 233 for linking to other leagues can be output to the user terminal.

The method for managing league points of a point lapsing league mode according to an exemplary embodiment of the present invention can be performed by an application (which may include a program included in a platform or an operating system mounted as a default on the terminal) installed in the user terminal as a default, and it can also be performed by an application (i.e., program) directly installed in a master terminal by the user through an application store server or an application providing server such as a web server relating to the application or a corresponding service. In this meaning, the above-described method for managing league points of a point lapsing league mode according to an exemplary embodiment of the present invention may be installed in the terminal as a default, or it may be realized as an application (i.e., program) directly installed by the user and may be recorded on a computer readable medium.

The programs are recorded in the computer readable recording medium and are executed by the computer, such that the above-mentioned functions may be executed.

As described, in order to execute the method for managing league points of a point lapsing league mode according to exemplary embodiments of the present invention, the above-mentioned program may include codes which are coded with computer languages such as C, C++, JAVA, machine language, and the like which may be read by a processor (CPU) of the computer.

The code may include a function code associated with a function of defining the above-mentioned functions, and may also include an execution procedure related control code required to allow the processor of the computer to execute the above-mentioned functions as a predetermined procedure.

Further, the code may include a memory reference related code indicating at which location (address number) of the memory inside or outside the computer additional information or media required to allow the processor of the computer to execute the above-mentioned functions are referenced.

In addition, to allow the processor of the computer to execute the above-mentioned functions, when the processor needs to communicate with any other computers or servers, etc. at a remote location, the code may further include a communication related code about how the processor of the computer communicates with any other computers or servers at a remote location or what information or media the processor of the computer transmits and receives at the time of the communication, by using the communication module (for example, wired and/or wireless communication module) of the computer.

Further, a functional program for implementing the present invention, a code and a code segment associated therewith, and the like may be easily inferred or changed by programmers in the art to which the present invention pertains in consideration of a system environment of the computer which reads the recording medium and executes the program.

Hereinabove, examples of a computer readable recording medium recorded with programs as described above include a ROM, a RAM, a CD-ROM, a magnetic tape, a floppy disk, an optical media storage device, and the like.

Further, a computer readable recording medium recorded with programs as described above may be distributed to a computer system connected through a network and thus stores and executes a computer readable code by a distributed manner. In this case, at least any one computer among a plurality of distributed computers may execute a part of the above-mentioned functions and transmit the executed results to at least one of other distributed computers and the computer receiving the result may also execute a part of the above-mentioned functions and provide the executed results to other distributed computers.

Particularly, a computer readable recording medium recorded with applications which are programs for executing the method for managing league points of a point lapsing league mode according to the exemplary embodiment of the present invention may be a storage medium (for example, a hard disk drive and the like) included in an application store server or an application providing server such as a web server associated with applications or corresponding services, and the like, or an application providing server itself.

A computer which may read a recording medium recorded with applications which are programs for executing the method for managing league points of a point lapsing league mode according to the exemplary embodiment of the present invention may include not only general PCs such as a typical desktop and a laptop but also mobile terminals such as a smart phone, a tablet PC, a personal digital assistant (PDA), and a mobile communication terminal, and is to be construed as all the computable devices.

Further, when a computer which may read a recording medium recorded with applications which are programs for executing the method for managing league points of a point lapsing league mode according to the exemplary embodiment of the present invention is mobile terminals such as a smart phone, a tablet PC, a personal digital assistant (PDA), and a mobile communication terminal, the applications are downloaded from an application providing server to a general PC and thus may also be installed in the mobile terminal by a synchronization program.

As described above, even though it is described that all constituent elements of the exemplary embodiment of the present invention are combined as one or combined to be operated, the present invention is not limited to the exemplary embodiment. That is, within the scope of purpose of the present invention, one or more constituent elements may be selectively combined to be operated. Further, all the constituent elements may be implemented as one independent piece of hardware, but a part or all of the constituent elements are selectively combined to be implemented as a computer program including a program module which performs a part of or all functions which is combined in one or a plurality of pieces of hardware. Codes and code segments which configure the computer program may be easily deduced by those skilled in the art. Such a computer program is stored in a computer readable medium to be read and executed by the computer to implement the exemplary embodiment of the present invention. A storage medium of the computer program may include a magnetic recording medium and an optical recording medium.

Further, unless explicitly described to the contrary, the word "comprise", "configure", and "have" will be understood to imply the inclusion of stated elements but not the exclusion of any other elements. Unless differently defined, all terminologies including a technical or scientific terminology may have the same meaning which is generally understood by those skilled in the art. Terminologies defined in generally-used dictionary shall be construed such that they have meanings matching those in the context of a related art, and shall not be construed in ideal or excessively formal meanings unless they are clearly defined in the present application.

Although the exemplary embodiments have been described, those skilled in the art will readily appreciate that many modifications are possible without materially departing from the novel teachings and advantages. Therefore, the exemplary embodiments disclosed in the present invention are not limited to the technical idea of the present invention and are to explain these exemplary embodiments, and the scope of the technical idea of the present invention is not limited by these exemplary embodiments. The protection range of the present invention should be construed by the claims below, and all technical ideas within an equivalent range thought should be construed as being included within the scope of the present invention.

The invention claimed is:

1. A method implemented by a server in electronic communication with a user terminal for managing league points of a point lapsing league mode of an online league game, the method comprising:
   providing, by the server to the user terminal, a point lapsing league mode in which predetermined league points are allocated to the user terminal for a predetermined period and progress of the online league game is restricted when all the predetermined league points are consumed by the user terminal;
   outputting, by the server to the user terminal, a game character information selecting interface for selecting a game character for progressing a game of the point lapsing league mode from at least one game character;
   consuming, by the server from the predetermined league points, preset league points to be consumed per game of the point lapsing league mode that are set to the selected game character before the game, when the user terminal finishes playing the game of the point lapsing league mode through the selected game character;
   determining, by the server, whether all the predetermined league points of the user terminal that played in the point lapsing league mode are consumed; and
   outputting, by the server to the user terminal, information for notifying that the online league game cannot be progressed in the point lapsing league mode, when all the predetermined league points of the user terminal that played in the point lapsing league mode are consumed,
   wherein the league points include league fixed points that are provided to the user terminal for the predetermined period as the predetermined league points and league floating points that are directly provided to the user terminal in an item form and are additionally usable irrespective of the fixed league points.

2. The method of claim 1, further comprising, when the user terminal inputs a selection of the game character to be used for the game, outputting, by the server to the user terminal, at least one among game character information usable for the game, capability point information of the selected game character, and the preset league points to be consumed per game of the point lapsing league mode that are set to the selected game character before the game.

3. The method of claim 1, wherein the predetermined league points are acquired when a game of another mode except the point lapsing league mode of the online league game is progressed.

4. The method of claim 1, wherein the outputting of the information for notifying that the online league game cannot be progressed in the point lapsing league mode comprises outputting, by the server to the user terminal, a link menu for linking to another league so that another mode except the point lapsing league mode of the online league game may be performed.

5. The method of claim 1, wherein the consuming comprises consuming, by the server from the predetermined league points, the preset league points to be consumed per game of the point lapsing league mode that are set to the selected game character before the game, when access with the user terminal is blocked while performing the game, the user terminal is determined to lose the game, and a next game is progressed by any user terminal.

6. A server in electronic communication with a user terminal for providing a point lapsing league mode of an online league game, the server comprising:
   a point lapsing league mode provider configured to provide, to the user terminal, a point lapsing league mode in which predetermined league points are allocated to the user terminal for a predetermined period and progress of the online league game is restricted when all the predetermined league points are consumed by the user terminal;
   a game character information provider configured to output, to the user terminal, a game character information selecting interface for selecting a game character for progressing a game of the point lapsing league mode from at least one game character;
   a league point manager configured to consume, from the predetermined league points, preset league points to be consumed per game of the point lapsing league mode that are set to the selected game character before the game, when the user terminal finishes playing the game of the point lapsing league mode through the selected game character;
   a league progressing state determiner configured to determine whether all the predetermined league points of the user terminal that played in the point lapsing league mode are consumed; and
   a league participating information provider configured to, when all the predetermined league points of the user terminal that played in the point lapsing league mode are consumed, output, to the user terminal, information for notifying that the online league game cannot be progressed in the point lapsing league mode, wherein the league points include, league fixed points that are given to the user terminal for the predetermined period as the predetermined league points, and league floating points that are directly provided to the user terminal in an item form and are additionally usable irrespective of the fixed league points.

7. The server of claim 6, wherein the game character information provider is further configured to output, to the user terminal, at least one among game character information usable for the game, capability point information of the selected game character, and the preset league points to be consumed per game of the point lapsing league mode that are set to the selected game character before the game, when the user terminal inputs a selection of the game character to be used for the game.

8. The server of claim 6, wherein the league point manager is further configured to exclude other league points of other user terminals from being consumed, when the game is a competition between a team including a plurality of users and an opponent player managed by artificial intelligence.

9. The server of claim 6, wherein the predetermined league points are acquired when a game of another mode except the point lapsing league mode of the online league mode is progressed.

10. The server of claim 6, wherein the league point manager is further configured to consume, from the predetermined league points, the preset league points to be consumed per game of the point lapsing league mode that are set to the selected game character before the game, when access with the user terminal is blocked while performing the game, the user terminal is determined to lose the game, and a next game is progressed by any user terminal.

11. The server of claim 6, wherein the league point manager is further configured to, when the game is a competition between users:
   block access between the users competing in the game; and
   return the consumed preset league points to a user winning the game among the users, when the access by the users is maintained.

12. The server of claim 6, wherein the league point manager is further configured to, when the game is a competition between a first user and a second user and the second user leaves before the game begins, return the consumed preset league points to the first user who cannot progress the game, when the access by the first user and the second user is maintained.

13. A non-transitory computer readable medium for recording a program for realizing a method for managing league points of a point lapsing league mode of an online league game, the method comprising:

providing, to a user terminal, a point lapsing league mode in which predetermined league points are allocated to the user terminal for a predetermined period and progress of the online league game is restricted when all the predetermined league points are consumed by the user terminal;

outputting, to the user terminal, a game character information selecting interface for selecting a game character for progressing a game of the point lapsing league mode from at least one game character;

consuming, from the predetermined league points, preset league points to be consumed per game of the point lapsing league mode that are set to the selected game character before the game, when the user terminal finishes playing the game of the point lapsing league mode through the selected game character;

determining whether all the predetermined league points of the user terminal that played in the point lapsing league mode are consumed; and when all the predetermined league points of the user terminal that played in the point lapsing league mode are consumed, outputting, to the user terminal, information for notifying that the online league game cannot be progressed in the point lapsing league mode, wherein the league points include league fixed points that are provided to the user terminal for the predetermined period as the predetermined league points, and league floating points that are directly provided to the user terminal in an item form and are additionally usable irrespective of the fixed league points.

* * * * *